(12) United States Patent
Phillips

(10) Patent No.: US 7,829,221 B2
(45) Date of Patent: *Nov. 9, 2010

(54) COBALT CONTAINING POSITIVE ELECTRODE FORMULATION FOR A NICKEL-ZINC CELL

(75) Inventor: Jeffrey Phillips, Saratoga, CA (US)

(73) Assignee: PowerGenix Systems, Inc., San Diego, CA (US)

( * ) Notice: Subject to any disclaimer, the term of this patent is extended or adjusted under 35 U.S.C. 154(b) by 966 days.

This patent is subject to a terminal disclaimer.

(21) Appl. No.: 10/899,593

(22) Filed: Jul. 26, 2004

(65) Prior Publication Data

US 2005/0003270 A1    Jan. 6, 2005

Related U.S. Application Data

(63) Continuation-in-part of application No. 10/429,711, filed on May 6, 2003, now Pat. No. 6,787,265, which is a continuation of application No. PCT/CA01/01717, filed on Nov. 7, 2001.

(30) Foreign Application Priority Data

Nov. 10, 2000    (CA) .................................. 2325640

(51) Int. Cl.
H01M 4/00    (2006.01)
H01M 4/48    (2006.01)
H01M 4/58    (2006.01)

(52) U.S. Cl. ..................... 429/223; 429/231; 429/218.1

(58) Field of Classification Search .............. 429/218.1, 429/223, 231, 229, 232; 29/623.1
See application file for complete search history.

(56) References Cited

U.S. PATENT DOCUMENTS

| | | | | |
|---|---|---|---|---|
| 3,647,544 | A | * | 3/1972 | Schneider .................. 429/210 |
| 3,870,564 | A | | 3/1975 | Takamura et al. |
| 3,951,687 | A | | 4/1976 | Takamura et al. |
| 3,961,985 | A | | 6/1976 | Takamura et al. |
| 4,003,754 | A | * | 1/1977 | Winsel et al. ................ 429/149 |
| 4,017,665 | A | | 4/1977 | Sandera et al. |
| 5,215,836 | A | | 6/1993 | Eisenberg |
| 5,523,182 | A | | 6/1996 | Ovshinsky et al. |
| 5,804,334 | A | * | 9/1998 | Yamamura et al. ........ 429/218.1 |
| 5,968,684 | A | | 10/1999 | Hayashi et al. |
| 6,040,007 | A | * | 3/2000 | Junichi et al. ............... 427/215 |
| 6,225,004 | B1 | | 5/2001 | Hayashi |
| 6,436,575 | B1 | * | 8/2002 | Weckesser et al. .......... 429/223 |
| 6,617,072 | B2 | * | 9/2003 | Venkatesan et al. ......... 429/223 |
| 6,649,305 | B1 | * | 11/2003 | Bugnet et al. ............... 429/231 |
| 6,787,265 | B2 | * | 9/2004 | Phillips .................... 429/223 |
| 7,261,972 | B2 | * | 8/2007 | Inada et al. .................... 429/94 |
| 2002/0037455 | A1 | * | 3/2002 | Tani et al. .................... 429/223 |
| 2002/0172758 | A1 | | 11/2002 | Tetsuo |
| 2003/0140483 | A1 | * | 7/2003 | Wakabayashi et al. ..... 29/623.1 |
| 2004/0115533 | A1 | * | 6/2004 | Phillips ...................... 429/231 |
| 2006/0029863 | A1 | | 2/2006 | Miyamoto et al. |
| 2009/0202904 | A1 | | 8/2009 | Geng et al. |
| 2009/0208839 | A1 | | 8/2009 | Geng et al. |

FOREIGN PATENT DOCUMENTS

| | | |
|---|---|---|
| EP | 0833397 | 4/1976 |
| EP | 0457354 | 11/1991 |
| EP | 0697746 | 2/1996 |
| EP | 0 902 490 | 3/1999 |
| EP | 1 172 869 | 1/2002 |
| EP | 1207576 | 5/2002 |
| EP | 1207576 A2 * | 5/2002 |
| EP | 1 367 666 | 12/2003 |
| EP | 1 699 099 | 9/2006 |
| JP | 54163324 | 12/1979 |
| JP | 56-29345 | 7/1981 |
| JP | 07037609 A * | 2/1995 |
| JP | 11297352 A * | 10/1999 |
| JP | 20058062 | 2/2000 |
| JP | 2005 056 733 | 3/2005 |

OTHER PUBLICATIONS

"WordNet Search." WordNet. Apr. 4, 2008 <http://wordnet.princeton.edu>.*

(Continued)

Primary Examiner—Dah-Wei D Yuan
Assistant Examiner—Zachary Best
(74) Attorney, Agent, or Firm—Weaver Austin Villeneuve & Sampson LLP

(57)    ABSTRACT

A nickel-zinc galvanic cell is provided, having a zinc oxide negative electrode, a nickel oxide positive electrode, and an alkaline electrolyte. Chemical additives are placed in each of the negative and positive electrodes. The positive nickel hydroxide electrode contains a mixture of cobalt oxide contained within a nickel oxide matrix in the range of about 1% to 10%, and cobalt metal in the range of about 1% to 10%, by weight. The negative zinc oxide electrode may contain oxides other than the oxide of zinc, which have redox potentials which are negative of −0.73 volts. Also, the metal oxide additives to the negative zinc oxide electrode are such as to inhibit release of soluble cobalt from the nickel oxide negative electrode prior to a formation charge being applied to the electrochemical cell.

18 Claims, No Drawings

OTHER PUBLICATIONS

"WordNet Search." WordNet. Dec. 3, 2008. <http://wordnet.princeton.edu/perl/webwn?s=embedded>.*

"WordNet Search." WordNet. Dec. 3, 2008. <http://wordnet.princeton.edu/perl/webwn?s=paste>.*

Ohta et al., "Nicel Hydroxide Electrode: Improvement of Charge Efficiency at High Temperature," The Electrochemical Society Proceedings, vol. 94-27, pp. 296-302, 1994.

Canada Office Action dated Apr. 30, 2008, from corresponding Canadian Patent Application No. 2,325,640.

International Search Report mailed Apr. 29, 2002, PCT Application PCT/UCA01/01717.

Japan Office Action dated Feb. 22, 2008, from corresponding Japan Patent Application No. 2002-541747, with English explanation from Japanese Associate of Office Action.

Japan Abstract, dated Feb. 25, 2000, from Japan Patent Application No. 2002-541747.

Search Report and Written Opinion dated May 13, 2009 for corresponding PCT Application No. PCT/US2009/033265.

Ying et al., "Surface modification of nickel hydroxide particles by micro-sized cobalt oxide hydroxide and properties as electrode materials," *Surface and Coatings Technology*, Elsevier, Amsterdam, NL, vol. 200, No. 7, (Dec. 21, 2005), pp. 2376-2379, XP005181204.

Canada Office Action dated Apr. 14, 2009, from Canadian Patent Application No. 2,325,640.

Japan Office Action dated Sep. 8, 2009, from Japan Patent Application No. 2002-541747, with English explanation from Japanese Associate of Office Action.

European Office Action dated Dec. 2, 2009 issued in 01993957.8.

PCT International Search Report and Written Opinion dated Jun. 22, 2010, from PCT Application No. PCT/US2010/033023.

* cited by examiner

COBALT CONTAINING POSITIVE ELECTRODE FORMULATION FOR A NICKEL-ZINC CELL

CROSS REFERENCE TO RELATED APPLICATIONS

This application is a continuation in part of U.S. patent application Ser. No. 10/429,711 filed May 6, 2003 now U.S. Pat. No. 6,787,265 by J. Phillips, which is in turn a continuation of International Application No. PCT/CA01/01717, filed Nov. 7, 2001, which claims priority under 35 USC 119 from Canadian Patent Application No. 2,325,640 filed Nov. 10, 2000. Each of these patent documents is incorporated herein by reference for all purposes.

FIELD OF THE INVENTION

This invention relates to alkaline galvanic cells having zinc electrodes and an alkaline electrolyte. More particularly, the present invention relates to high energy density rechargeable cells having zinc or zinc-based negative electrodes, an alkaline electrolyte, and positive electrodes which may be, for example, nickel, silver, air, or iron.

BACKGROUND

The provision of rechargeable zinc batteries having alkaline electrolytes is well known. Leaving aside the question of zinc/manganese dioxide cells, which find dominance in commercial fields supplying cells (batteries) for use in flashlights, toys, low drainage devices such as electric clocks, and the like, there is also a very large market and requirement for high energy density, high capacity cells and batteries such as nickel-zinc, silver-zinc, and zinc-air batteries, as well as a recently introduced super iron-zinc battery. A requirement is, however, that such cells and batteries must be cycled many times through discharge/charge cycles; leading in turn to several further requirements. The first is that the capacity of the rechargeable cell should not diminish significantly over a number of cycles, there should be no significant shape change—particularly of the zinc electrode—and no significant dendrite formation. Most especially, newly developed high energy density rechargeable zinc cells should be free or substantially free of toxicity, so as to be environmentally benign. This means, in particular, that a robust, long-lasting, rechargeable battery must be brought to the market which contains no cadmium, no lead, and no mercury.

In the following discussion, the terms "cell" and "battery" may be used interchangeably. Of course, it is recognized that a cell comprises two electrodes, one positive and one negative, and an electrolyte; and a battery may comprise a number of cells which are joined together in series, parallel, or series/parallel. In many batteries, of course, there are a plurality of negative and positive plates and a common electrolyte all contained in a single casing; and in some cases, the plates may be bipolar. In other batteries, there may be a plurality of self-contained cells, each having their own positive and negative electrodes and electrolyte. Moreover, cells and batteries may be cylindrical or rectangular, they may comprise flat plates or rolled plates, and they may have a relatively low voltage of one or two volts. Batteries may have a relatively high voltage, in the range of twelve to sixteen volts, sometimes much higher. The present invention applies to any of the above considerations in respect of cells and batteries, as it relates to the structure of the electrodes.

Batteries in keeping with the present invention will find particular utility in traction markets, being used on scooters and bicycles, as well as in hybrid automobiles, UPS applications, hobbyist markets, and in the power tool market. In such markets, there is a very great necessity for sealed battery systems, which have high energy density and, therefore, relatively low weight per amp-hour unit capacity, as well as low cost per amp-hour unit capacity. Moreover, batteries in keeping with the present invention will provide high amp-hour capacity per unit volume.

A particular feature of the present invention is that long life, rechargeable zinc electrodes may be supplied which can be manufactured using equipment that is presently used for nickel cadmium or nickel metal-hydride production. Typically, electrodes which embody the present invention are pasted on a high conductivity, low resistance matrix or carrier, which might conveniently be manufactured from copper and/or suitable alloys thereof. One example of a suitable manufacturing technique for batteries and cells of the present invention is described in U.S. Provisional Patent Application No. 60/496,208, filed Aug. 18, 2003 by J. Phillips et al. and titled "METHOD OF MANUFACTURING NICKEL ZINC BATTERIES," which is incorporated herein by reference for all purposes.

In order to minimize shape change and dendrite growth, and to provide a stable construction so as to achieve prolonged cycle life, high power over the life of the battery, and maximum energy density, careful choice must be made of the combination of the zinc electrode and the electrolyte for the battery.

Typically, batteries in keeping with the present invention employ a buffered borate electrolyte such as that which is taught in EISENBERG U.S. Pat. No. 5,215,836, issued Jun. 1, 1993, which is incorporated herein by reference for all purposes. That patent teaches alkaline galvanic cells having an electrolyte composition which comprises a solution of a salt formed by reacting boric acid (or, alternatively, phosphoric acid or arsenic acid) with an alkali or earth alkali hydroxide which is present in a sufficient amount to produce a stoichiometric excess of hydroxide to acid in the range of 2.5 to 11.0 equivalents per liter. As well, a soluble alkali or earth or earth alkali fluoride is present, in an amount corresponding to a concentration range of 0.01 to 1.0 equivalents per liter of total solution.

The performance of rechargeable zinc electrodes in alkaline electrolytes has been the subject of many studies that encompass the zinc electrode composition and the interaction with the electrolyte. A performance inhibiting disfigurement of the zinc electrode occurs as cycling progresses. The most obvious effect is a lower than acceptable amp-hour capacity delivered at useable voltages. This tendency has been arrested by a number of approaches. The combination of more dilute potassium hydroxide electrolyte together with the addition of calcium hydroxide to the Zinc electrode appears to be particularly effective (U.S. Pat. No. 4,358,517 issued Nov. 9, 1982 to JONES). Alternate approaches have used buffered electrolytes with and without fluoride additions that have also resulted in increased zinc electrode life span. Noteworthy among these approaches is that described in U.S. Pat. No. 5,453,336 issued Sep. 26, 1995 to ADLER et al. which teaches a mixture of alkaline electrolyte (2-12M) combined with a carbonate of 0.5-4M and a fluoride of 0.5-4M is particularly effective. U.S. Pat. No. 4,273,841 issued Jun. 16, 1981 to CARLSON describes another mixture that employs 5-10% hydroxide, 10-20% phosphate and 5-15% fluoride. EISENBERG describes two electrolyte formulations in U.S. Pat. No. 4,224,391 issued Sep. 23, 1980 and U.S. Pat. No.

5,215,836 issued Jun. 1, 1993. Both employ mixtures of potassium hydroxide and boric, phosphoric or arsenic acid. However the latter patent describes advantages of alkali fluorides in the range of 0.01 to 1M. This should be implemented in combination with a more alkaline electrolyte.

Electrode additions of numerous oxide additives have been investigated and proved to be beneficial (U.S. Pat. No. 5,556,720 issued Sep. 17, 1996 to CHARKEY and U.S. Pat. No. 4,084,047 issued Apr. 11, 1978 to HIMY et al.). Some oxides are claimed to result in a conductive metal matrix that enhances electrode conductivity; others may result in the formation of beneficial alloys and a reduction in hydrogen evolution. Zinc fluoride and zinc titanate (U.S. Pat. No. 4,304,828 issued Dec. 8, 1981 to VAIDYANATHAN) and the direct additions of alkali fluoride to the zinc electrode have also been found beneficial (U.S. Pat. No. 4,017,665 issued Apr. 12, 1977 to SANDERA et al.).

It should also be noted that lead, cadmium, and mercury oxides are particularly favored as electrode enhancement additives. However, these oxides impart a toxicity to the electrode that is undesirable—and, in some instances, unacceptable.

SUMMARY

The present invention provides positive and negative electrodes for nickel-zinc galvanic cells, as well as the cells themselves. One aspect of the invention provides a nickel oxide positive electrode having a mixture of (a) cobalt oxide, co-precipitated with nickel oxide, in the range of about 1% to 10%, by weight, and (b) cobalt metal in the range of about 1% to 10%, by weight. For applications requiring relatively high rates of discharge, the cobalt metal in the nickel oxide positive electrode is preferably present in a range of about 4% to 10% by weight. For some other applications, it may be preferable to employ a lower concentration of the cobalt metal, e.g., in a range of about 1% to 5% by weight.

Another aspect of the invention pertains to nickel-zinc cells containing at least a zinc oxide negative electrode, a nickel oxide positive electrode as just described, and an alkaline electrolyte. As explained below, the zinc oxide negative electrode may contain a metal oxide additive, other than zinc oxide. Such oxide additives are sometimes added to suppress hydrogen evolution during operation of zinc cells. As explained below, the additive oxides typically added the zinc negative electrode sometimes facilitate deleterious release of cobalt from the positive electrode. Lead oxide is an example of an additive having this problem. To address this issue the invention provides other oxide additives for the negative electrode, preferably provided at a concentration of between about 1% and 15% by weight in the zinc electrode. These are selected to inhibit release of soluble cobalt from the nickel oxide positive electrode prior to a formation charge being applied to the nickel-zinc cell. In some embodiments, the additive is an oxide having a redox potential negative of about −0.73 volts. Alternatively, or in addition, the additive may have a solubility of less than about $10^{-4}$ M in the alkaline electrolyte. Specific examples of the oxide additives for use with this invention include bismuth oxide and indium oxide, which has a redox potential of −1.0V. It has been found that such oxides are preferably present in a concentration of about 1% to 15% by weight.

Yet another aspect of the invention pertains to methods of discharging a nickel-zinc cell comprising a zinc oxide negative electrode, a nickel oxide positive electrode as described above, preferably having cobalt metal present in the range of about 1% to 10%, by weight. The method may be characterized by the following: (a) connecting the nickel-zinc cell to a load; and (b) discharging the nickel-zinc cell at a rate of about 0.001 to 0.4 Amperes/$cm^2$ of zinc electrode surface area. In a typical high rate application, the load is a power tool and the concentration of cobalt metal of between about 4-10% by weight in the positive electrode. A typical high rate discharge is conducted at about 0.01 to 0.4 Amperes/$cm^2$ of zinc electrode surface area. In a typical low rate application, the load is a consumer electronics device, the concentration of cobalt metal is between about 1-5% by weight, and the discharge is conducted at about 0.001 to 0.01 Amperes/$cm^2$ of zinc electrode surface area.

These and other features and advantages of the invention will be set forth in more detail below.

DETAILED DESCRIPTION OF A PREFERRED EMBODIMENT

It has not previously been recognized that there is considerable interaction between the positive and the negative electrodes—particularly in a cell having an alkaline electrolyte. Such interaction can lead to deleterious contamination of the negative electrode, with resulting shortened cycle life. In particular, the cobalt materials that are commonly added to a nickel positive electrode often become soluble; and this permits them to diffuse to the negative electrode where they are reduced. This, in turn, increases the hydrogen evolution tendency of the negative electrode throughout the life of the cell. The result of the increased decomposition of the electrolyte is that the cell will dry out prematurely. Even more dramatically, these compounds can cause soft short circuits in the cell that prematurely drain the battery.

It is common practice to add cobalt oxides to a nickel hydroxide paste to affect additional conductivity between the active material particles (see U.S. Pat. Nos. 5,759,718 & 5,489,314, for example). As the CoO material slowly dissolves and is oxidized to a conductive insoluble CoOOH, a conductive network is set up in situ. In some cases, external chemical oxidants are used to promote the reaction (see U.S. Pat. No. 5,489,314). The cobalt oxide also promotes charging efficiency in that it lowers the voltage at which the positive electrode charges and thereby reduces the amount of oxygen evolution and possibly other parasitic reactions that can occur during charge. Other materials may provide this advantage and their use is within the scope of this invention. Examples include strontium hydroxide ($Sr(OH)_2$), barium oxide (BaO), calcium hydroxide ($Ca(OH)_2$), $Fe_3O_4$, calcium fluoride ($CaF_2$), and yttrium oxide ($Y_2O_3$). See Nickel Hydroxide Electrode: improvement of charge efficiency at high temperature by K. Ohta, K. Hyashi, H Matsuda, Y. Yoyoguchi and Mikoma in The Electrochemical Society proceedings Volume 94-27 (Hydrogen and Metal Hydride Batteries edited by T. Sakaai and P. D. Bennett), which is incorporated herein by reference for all purposes.

The tendency for the leaching cobalt materials to generate short circuits was referred to in U.S. Pat. No. 5,435,055. The answer appeared to be to oxidize the electrode to an extent equal to 5% of the cell rated capacity. However, it was not recognized that the problem is not primarily associated with cobalt metal inclusion, but rather it comes as a consequence of the solubility of the cobalt oxide.

It has been observed that in common formulations of the positive nickel hydroxide electrode, a blue coloration signifying soluble cobalt species occurs within a few hours after the addition of electrolyte. This "discoloration of the electrolyte" has been found to be a prediction of heavier gassing rates of the zinc electrode in nickel-zinc cells. In particular, after being subjected to this phenomenon, the zinc electrode appears to have a much less light grey coloration, and it has a less uniform color. Also, the zinc electrode is more likely to release hydrogen gas.

It has been found that the cobalt oxide additives to the nickel hydroxide active material are the principal cause of the problem. It has been determined that cobalt oxide that is trapped within the nickel hydroxide matrix (by co-precipitation, sintering, or other suitable process) is not a problem. This material exhibits very little tendency to dissolve in the electrolyte in the normal operating voltage range of the cell. The elimination of freely added cobalt oxides, and the optional addition of cobalt powder alone in the nickel electrode, significantly reduces the release of the cobalt ions into the electrolyte solution. This not only can reduce gassing, but also can reduce the risk of soft short circuits within the cell. More surprisingly, there appears to be a significant effect of the additives normally associated with the performance of the zinc electrode.

Significantly, the presence of lead oxide in the negative electrode promotes the release of cobalt, and the presence of bismuth oxide is inconsequential. The interaction of the lead ions and the cobalt ions is not fully understood, but it is suspected that the combination of higher solubility in the electrolyte and an appropriately more positive redox potential to the cobalt couple may be responsible. Consequently, those zinc electrode additives that exhibit either low solubility in the electrolyte (e.g., not greater than about $10^{-4}$M), or redox potentials approximately negative of the level associated with the cobalt/cobalt oxide couple (−0.73V), are preferred.

Generally, the negative electrode employs zinc oxide as an electrochemically active material and one or more metal oxides other than zinc oxide (e.g., bismuth oxide, indium oxide, and/or aluminum oxide). In addition, the negative electrode may include other additives such as binders, materials that facilitate wetting, and the like. Preferably, the metal oxide other than zinc oxide is present in the negative electrode at a concentration of about 1% to 15% by weight.

The nickel oxide positive electrode includes cobalt oxide contained within a nickel oxide matrix. Preferably it is provided in the range of about 1% to 10% by weight in the positive electrode. The positive electrode may also include cobalt metal, also preferably in the range of about 1% to 10% by weight in the positive electrode.

As a typical example, the positive electrode may be manufactured from nickel hydroxide ($Ni(OH)_2$), zinc oxide, cobalt oxide (CoO), cobalt metal, nickel metal, and a flow control agent such as carboxymethyl cellulose (CMC). Note that the metallic nickel and cobalt may be chemically pure or alloys. In a preferred embodiment, at least some of the zinc oxide and cobalt oxide are provided with the nickel hydroxide in a chemical mixture, whereby individual particles contain nickel II hydroxide, zinc oxide and cobalt oxide. Such premixed materials may be prepared by co-precipitation of the individual components or may be acquired in a commercially available formula from commonly known vendors such as International Nickel Corporation, and Tanaka. These materials resist leaching of the cobalt oxide and zinc oxide by locking the oxides into the insoluble nickel II hydroxide matrix. Co-precipitation also apparently helps charge transfer efficiency by creating conductive channels through the positive electrode materials. In a preferred embodiment, the zinc oxide and cobalt oxide are each present in the co-precipitated material in concentrations of about 2-3% by weight for the zinc and 2-6% for the cobalt oxide. Other materials may be used in place of (or in addition to) cobalt oxide. These include strontium hydroxide ($Sr(OH)_2$), barium oxide (BaO), calcium hydroxide ($Ca(OH)_2$), $Fe_3O_4$, calcium fluoride ($CaF_2$), and yttrium oxide ($Y_2O_3$). Any of which may be provided as chemically homogeneous components or may be co-precipitated with nickel hydroxide or otherwise locked in a nickel hydroxide matrix.

It can be appreciated that any of a number of current collectors may be used with the positive electrode including, but not limited to, nickel, nickel plated steel, silver, and the like. For the negative electrode, copper and copper alloys are particularly preferred materials for the current collector given copper's low resistivity, relatively low price, and electrochemical compatibility with the zinc electrode. The current collectors may be made from sheets, including perforated sheets, foams, expanded metals and the like.

Many different types of aqueous electrolyte may be employed. In one example, the electrolyte includes an alkali hydroxide, boric acid or a borate, and an alkali fluoride. A particularly preferred electrolyte includes (1) an alkali or earth alkali hydroxide present in an amount to produce a stoichiometric, excess of hydroxide to acid in the range of about 2.5 to 11 equivalents per liter, (2) a soluble alkali or earth alkali fluoride in an amount corresponding to a concentration range of about 0.01 to 1 equivalents per liter of total solution, and (3) a borate, arsenate, and/or phosphate salt (preferably potassium borate, potassium metaborate, sodium borate, and/or sodium metaborate). In one specific embodiment, the electrolyte comprises about 4.5 to 10 equiv/Liter of potassium hydroxide, from about 2 to 6 equiv/Liter boric acid or sodium metaborate and from about 0.01 to 1 equivalents/Liter of potassium fluoride. A currently preferred electrolyte for high rate applications comprises about 8 equivalents per liter of hydroxide, about 4.5 equivalents of boric acid and about 0.2 equivalents of potassium fluoride.

The invention is not limited to these electrolyte compositions. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation.

As suggested, high rate applications such as power tool applications require relatively higher electronic and ionic conductivity in the electrodes and electrolyte. Thus, relatively high discharge (e.g., average discharge rates of about 0.01 to 0.4 Amperes/$cm^2$) applications may dictate relatively higher concentrations of cobalt metal in the positive electrode (e.g., about 4-10% by weight). Lower discharge rate (e.g., average discharge rates of about 0.001 to 0.01 Amperes/$cm^2$) applications such as load leveling for power companies may not require such high concentrations of metallic cobalt. About 1-5% by weight cobalt may be sufficient for these applications.

Experimental Example

Spiral wound cells were assembled with pasted positive nickel hydroxide electrodes and zinc oxide negative electrodes. A negative electrode water based paste was mixed using 80% zinc oxide, 8% bismuth oxide and 1% alumina fiber, and less than 1% carboxy methyl cellulose and dispersants. The paste was applied to perforated copper foil and dried at 60° C. for one hour. After this time the electrode was compressed in a rolling press to achieve a final thickness of 22 mil and a porosity of 49-51%.

Two positive electrodes were fabricated from two positive pastes differing only in the amount of cobalt metal. The first paste contained 85% nickel hydroxide with 3% co-precipitated zinc oxide & 3% co-precipitated cobalt oxide, together with 3% nickel 210 powder and 3% cobalt metal. The remainder of the solids was composed of 1.5% Teflon and less than 0.5% carboxy methyl cellulose. The second paste contained 81% nickel hydroxide with 3% co-precipitated zinc oxide and 3% co-precipitated cobalt oxide together with 3% nickel 210 powder and 7% cobalt metal. The remainder of the solids was composed of 1.5% Teflon powder and less than 0.5% carboxy methyl cellulose. Both nickel pastes were individually applied via a pasting head into a highly porous nickel foam current collector. The electrodes were dried and compressed to a final porosity of 43%.

The negative electrodes were tabbed with 0.125 inch wide and 0.003 inch thick copper at approximately 1 inch intervals along the length. The positive electrodes were tabbed similarly with 0.125 inch wide and 0.003 thick nickel strip.

The positive electrodes were wrapped in microporous separator from Advanced Membranes Systems company and the negatives were wrapped in non woven polyamide from Freudenberg Corporation. Both electrodes and accompanying separator were wrapped in a jelly roll configuration before adding 7 g of electrolyte.

The electrolyte was a mixture of 8.4M potassium hydroxide and 1.5M boric acid, 0.2M potassium fluoride and 0.1M lithium hydroxide.

After addition of the electrolyte the cells were initially charged at C/16 (74 mA) for 24 hours.

Subsequent to the first charge the cells were discharged at 0.5 A and 10 A. The delivered capacity is shown in the following table.

| Positive Composition | 0.5 A Capacity (% theoretical) | 10 A Capacity (% theoretical) |
| --- | --- | --- |
| 3% cobalt metal | 85 | 40 |
| 7% cobalt metal | 89 | 84 |

Other modifications and alterations may be used in the design and manufacture of the apparatus of the present invention without departing from the spirit and scope of the accompanying claims.

What is claimed is:

1. A nickel-zinc galvanic cell with reduced hydrogen gas evolution comprising a zinc oxide negative electrode, a nickel oxide positive electrode, and an alkaline electrolyte, wherein said nickel oxide positive electrode comprises a mixture of (a) individual particles containing cobalt oxide contained within a nickel hydroxide matrix in chemical mixture, whereby the cobalt oxide is trapped within a nickel hydroxide matrix of the individual particles to thereby minimize dissolution of the cobalt oxide in the alkaline electrolyte, said cobalt oxide in the range of about 1% to 10% by weight in the positive electrode, and (b) cobalt metal in the range of about 1% to 5% by weight in the positive electrode.

2. The nickel-zinc cell of claim 1, wherein said zinc oxide negative electrode comprises a metal oxide, other than zinc oxide, which has a redox potential negative of about −0.73 volts.

3. The nickel-zinc cell of claim 2, wherein the metal oxide other than zinc oxide is such as to inhibit release of soluble cobalt from the nickel oxide positive electrode prior to a formation charge being applied to the nickel-zinc cell.

4. The nickel-zinc cell of claim 1, wherein the zinc oxide negative electrode comprises about 1% to 15% by weight of a metal oxide other than zinc oxide, having a solubility less than about $10^{-4}$M in the alkaline electrolyte.

5. The nickel-zinc cell of claim 1, wherein the zinc oxide negative electrode comprises bismuth oxide.

6. The nickel-zinc cell of claim 5, wherein the bismuth oxide is present in the negative electrode in a concentration of about 1% to 15% by weight.

7. The nickel-zinc cell of claim 1, wherein the zinc oxide negative electrode comprises indium oxide.

8. The nickel-zinc cell of claim 7, wherein the indium oxide is present in the negative electrode in a concentration of about 1% to 15% by weight.

9. The nickel-zinc cell of claim 1, wherein the cobalt metal in the nickel oxide positive electrode is present in a range of about 4% to 5% by weight.

10. The nickel-zinc cell of claim 1, wherein the cobalt oxide contained within a nickel oxide matrix is co-precipitated with the nickel oxide.

11. A nickel-zinc galvanic cell comprising a zinc oxide negative electrode, a nickel oxide positive electrode, and an alkaline electrolyte, wherein said nickel oxide positive electrode comprises a mixture of (a) co-precipitated cobalt oxide and nickel hydroxide in chemical mixture, the cobalt oxide being in the range of about 1% to 10% by weight in the positive electrode, and (b) cobalt metal in the range of about 1% to 10% by weight in the positive electrode, wherein the positive electrode mixture contains no freely added cobalt oxides and only leach-resistant cobalt oxide locked in a nickel hydroxide matrix; thereby substantially preventing diffusion of cobalt species to the negative electrode and reducing hydrogen gas evolution.

12. The nickel-zinc cell of claim 11, wherein said zinc oxide negative electrode comprises a metal oxide, other than zinc oxide, which has a redox potential negative of about −0.73 volts.

13. The nickel-zinc cell of claim 12, wherein the metal oxide other than zinc oxide is such as to inhibit release of soluble cobalt from the nickel oxide positive electrode prior to a formation charge being applied to the nickel-zinc cell.

14. The nickel-zinc cell of claim 11, wherein the zinc oxide negative electrode comprises about 1% to 15% by weight of a metal oxide other than zinc oxide, having a solubility less than about $10^{-4}$M in the alkaline electrolyte.

15. The nickel-zinc cell of claim 11, wherein a bismuth oxide is present in the negative electrode in a concentration of about 1% to 15% by weight.

16. The nickel-zinc cell of claim 11, wherein a indium oxide is present in the negative electrode in a concentration of about 1% to 15% by weight.

17. The nickel-zinc cell of claim 11, wherein the cobalt metal in the nickel oxide positive electrode is present in a range of about 4% to 10% by weight.

18. The nickel-zinc cell of claim 11, wherein the cobalt metal in the nickel oxide positive electrode is present in a range of about 1% to 5% by weight.

* * * * *